(12) United States Patent
Pedlow, Jr. et al.

(10) Patent No.: US 7,992,162 B2
(45) Date of Patent: *Aug. 2, 2011

(54) LOCATION DETECTOR FOR DIGITAL TELEVISION APPLIANCES

(75) Inventors: Leo M. Pedlow, Jr., Ramona, CA (US); Aran London Sadja, La Jolla, CA (US); Eric James Holcomb, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/462,383

(22) Filed: Aug. 3, 2009

(65) Prior Publication Data

US 2009/0293084 A1  Nov. 26, 2009

Related U.S. Application Data

(63) Continuation of application No. 11/085,369, filed on Mar. 21, 2005, now Pat. No. 7,644,424.

(60) Provisional application No. 60/580,153, filed on Jun. 15, 2004.

(51) Int. Cl.
*H04N 7/16* (2011.01)

(52) U.S. Cl. ........... 725/25; 725/131; 725/139; 725/151

(58) Field of Classification Search ........................ None
See application file for complete search history.

(56) References Cited

U.S. PATENT DOCUMENTS

| | | | |
|---|---|---|---|
| 6,256,393 B1 * | 7/2001 | Safadi et al. | 380/232 |
| 6,791,995 B1 * | 9/2004 | Azenkot et al. | 370/436 |
| 2002/0124193 A1 | 9/2002 | Colman | |
| 2003/0237089 A1 | 12/2003 | Wajs | |
| 2004/0114912 A1 * | 6/2004 | Okamoto et al. | 386/114 |
| 2006/0064201 A1 * | 3/2006 | Chirnomas | 700/242 |

OTHER PUBLICATIONS

International Search Report and Written Opinion, PCT/US05/17037, Apr. 10, 2007.
ITU-T Rec. J.83:1997 Digital multi-programme systems for television, sound and data services for cable distribution. Geneva: International Telecommunication Union, Apr. 1997.
ISO/IEC 13818-1:2000, Information Technology—Coding of moving pictures and associated audio—Part 1: Systems. Geneval: International Organization for Standardization/International Electrotechnical Commission, Dec. 2000.

(Continued)

*Primary Examiner* — Joseph P Hirl
*Assistant Examiner* — Fred Peng
(74) *Attorney, Agent, or Firm* — Miller Patent Services; Jerry A. Miller

(57) ABSTRACT

A method of auditing operation of a television appliance consistent with certain embodiments involves detecting an event that triggers an audit; generating a fingerprint value, wherein the fingerprint value is function of the television network characteristics at an authorized installation location; comparing the fingerprint value with a stored reference value; if the fingerprint value is within specified limits of the stored reference value, permitting the television appliance to carry out a normal operational function; and if the fingerprint value is outside of specified limits of the stored reference value, inhibiting the television appliance from carrying out a normal operational function. This abstract is not to be considered limiting, since other embodiments may deviate from the features described in this abstract.

29 Claims, 6 Drawing Sheets

OTHER PUBLICATIONS

B.P. Lathi, Signals, System and Controls. New York: Harper & Row, 1974, pp. 207-214 and pp. 428-456.

A. Bruce Carlson, Communication Systems, $3^{rd}$ ed. New York: McGraw-Hill, 1986, pp. 514-517 and pp. 550-554.

Edward A. Lee and David G. Messerschmitt, Digital Communication, $2^{nd}$ ed. Boston: Kluwer Academic, 1994, pp. 442-550.

Richard E. Blahut, Digital Transmission of Information. New York: Addison-Welsley, 1990, pp. 159-170.

* cited by examiner

LOCATION DETECTOR FOR DIGITAL TELEVISION APPLIANCES

CROSS REFERENCE TO RELATED DOCUMENTS

This is a continuation of allowed U.S. patent application Ser. No. 11/085,369 to Pedlow, Jr. et al. filed Mar. 21, 2005 now U.S. Pat. No. 7,644,424 which claims priority benefit of U.S. Provisional patent application No. 60/580,153, Filed Jun. 15, 2004 to Pedlow, Jr., et al. both of which are hereby incorporated herein by reference in their entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Digital cable television appliances are becoming mainstream devices in the modem home. These devices may be stand-alone "set top boxes" that are either leased from the cable operator or purchased by the consumer through retail channels. The device may also be integrated directly into new television receivers as part of the "plug and play" initiative for digital television, for example as mandated by the U.S. FCC (Federal Communications Commission).

As the cost of implementing digital decoding capabilities in consumer products rapidly declines and the prevalence of digital programming on cable television systems grows, the cable industry is executing plans for removal of all remaining analog television services from their systems to reclaim spectrum, reduce operational costs and reduce signal theft. The result, for the foreseeable future, will be that cable operators must supply their customers having legacy analog televisions, VCRs, etc. with digital converters that convert the digital signals to analog signals used by these legacy devices in order for these devices to continue operation in an all-digital network.

Industry estimates at this writing indicate that there may be four or more legacy analog devices attached to the cable system in a typical household in addition to any existing digital cable converter or CableCARD™ enabled products. Because of the sheer volume of digital converters that the cable operators will need to deploy to support all of the analog devices presently in their subscribers' homes, and the fact that these devices cannot presently utilize electronic program guides, video-on-demand or pay-per-view services, cable operators have no method to recover the huge capital outlay on the advanced, two-way digital cable boxes they currently have available to deploy. As a result, their attention is now focusing upon very inexpensive, one-way digital converters for this purpose, providing current analog subscribers like-for-like digital service at a significantly lower cost to the operator than replacing analog devices with presently available two-way devices. Many cable operators, for regulatory and other reasons, intend to provide these one-way converters at no cost to their subscribers and believe that the cost of providing these devices can be more than offset through the recovery of valuable spectrum, reduction of operational costs—i.e. "truck rolls" (service calls) for. connect/disconnect and elimination of signal theft.

These simple digital converters are generally intended only for the most basic service tiers, ones that are presently delivered in analog form and therefore left unprotected against unauthorized reception, unlike the current premium services, which employ modern digital encryption. A conservative estimate is that as many as one third of the channels carried in modern cable systems are presently still analog basic services and national research indicates that roughly 11.5 million U.S. households steal these cable services each year at a cost of $6.5 billion in lost revenue annually (see Cox Communications Press Release Cox Communications Joins Nationwide Signal Theft Awareness Week June 1-5, BUSINESS WIRE, May 21, 2004).

The transition of the basic tiers from analog services to exclusively digital services having encryption applied will eliminate most of the present forms of signal theft that occur because these new digital converters will be individually addressable by the cable operator. Unlike today, merely having physical access to the cable signal either through unauthorized connection by tampering or because there hasn't been a costly dispatch of field personnel to the premises to implement a disconnect will no longer suffice for present analog customers to receive services for which the cable operator is not compensated. This also applies to new digital television receivers if the owner has not obtained a CableCARD™ from the cable operator and had it electronically authorized for service.

A typical conversion scenario for the all-digital transition would be for a cable operator to upgrade a headend serving a community or city to carry basic tier content in digital form in addition to the analog format presently carried. Next, all current two-way devices deployed for decoding premium digital services are reprogrammed to receive only digital content, including the new digital replacements for the analog tier, instead of the present mixed formats. In parallel, the operator will begin distribution of the new one-way converters to existing subscribers based upon the number of cable outlets in the home that are reported by the subscriber as connected to a legacy analog device (Video Cassette Recorder, television, etc.). There is no way for the cable operator to determine externally the analog device count without either surveying the subscribers or performing a physical audit. The operator will likely deploy these new converter devices en-masse to subscribers as each node of served by a cable headend is converted from mixed analog/digital to all digital through the removal of analog services. A node typically serves from 500 to 2000 customers and the converters must be available to subscribers prior to cutover to avoid service interruption.

While the introduction of all-digital services and low cost digital converters would seem to address all the issues of unauthorized viewing and signal theft, because the low cost converters are only one-way devices, a new opportunity to deprive cable operators of fair payment for service emerges. When subscribers are contacted to determine the quantity of converters necessary for supporting the analog appliances in the home, the subscriber may intentionally "over-report" the quantity of analog appliances in the home. They can later provide the converters received from the cable operator to friends, family, etc. to "split the costs" of basic cable service. There are other models where one-way converters can be redistributed without the knowledge or authorization of the cable operator. Since these devices are assigned by the operator to a valid subscriber, they remain authorized and the cable operator is deprived of subscription revenue because the devices are present in locations other than the home of record for the authorized subscriber.

Other one-way devices that attach to the cable network also suffer from the same issue. The new CableCARD™ device for digital televisions is an example of such a device that suffers the same vulnerability to unauthorized redirection. Two-way devices, such as existing digital cable decoders for premium services, are less likely to suffer from this issue because there are ways to detect electronically the location of these devices through headend interrogation and response with the time delay to respond being measured to determine the cable distance to the device. In such an application, the response time values for two devices assigned to the same address can be compared for similarity and physical proximity inferred.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
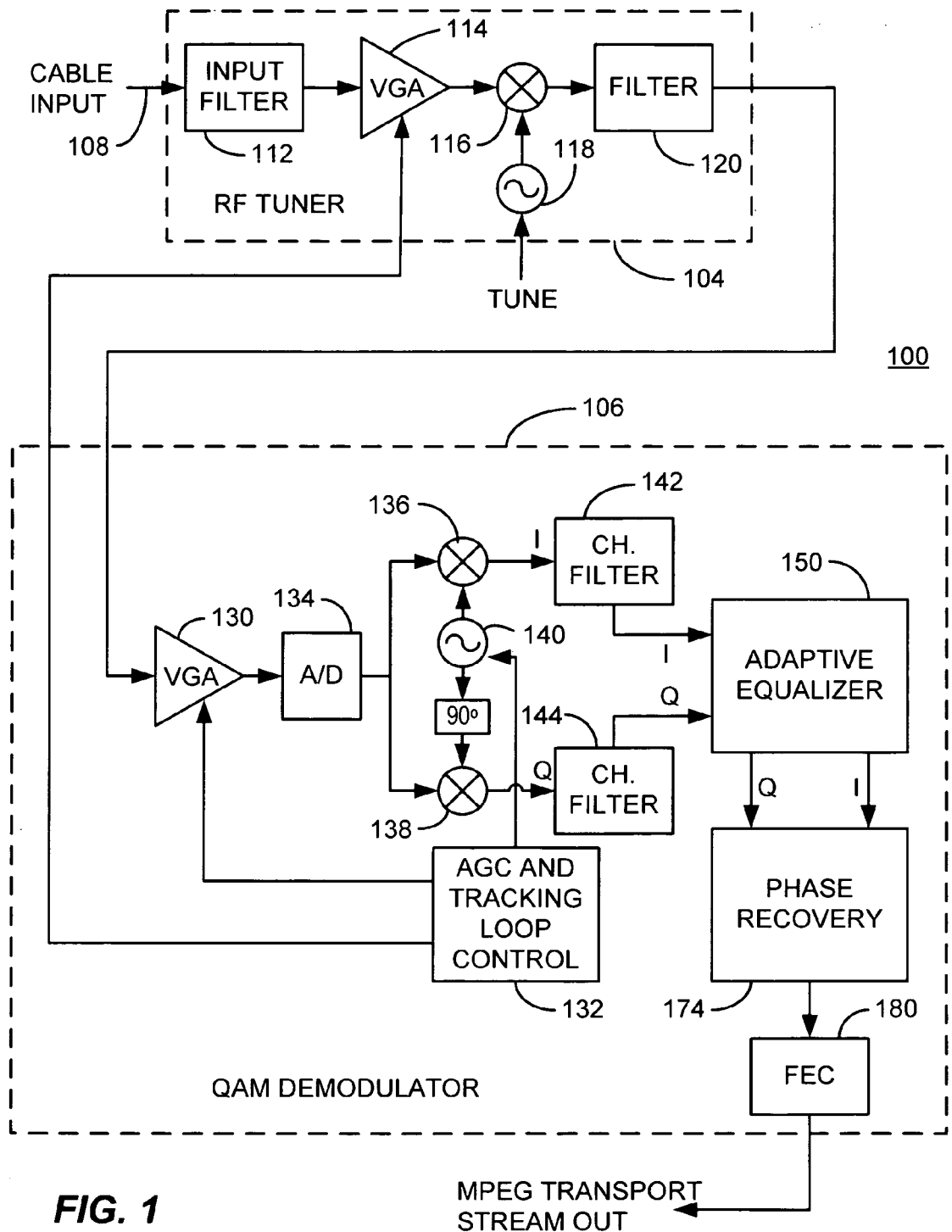
FIG. 1 is a block diagram of an exemplary cable network interface consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

This document describes exemplary embodiments of a robust method and apparatus to self-detect the unauthorized relocation of a one-way (receive only) digital cable television appliance such as a digital converter set-top box. However, it should be noted that the technology described herein is not limited to one-way devices, since it can also be applied advantageously to two-way devices. Thus, the description to follow, while described in terms of a one-way device is not to be considered limited to such devices. The exemplary embodiments presented have high resolution, yet generally require no additional hardware to be added to the product in which it is implemented. Implementation of the concept uses resources already present in all digital cable devices. Also described in detail is how the method can be applied in operation. A system for automated management is presented wherein subscribers could self-activate attached devices without need for operator intervention under normal circumstances.

Regardless of the end use of a particular device, all appliances attached to the digital cable network share a great deal of similarity in their front-end topology. While minor variations may exist, the topology depicted in FIG. 1 in block diagram form as front end 100 is generally a good representation of the front end topology of such devices. The elements that make up the network interface are available from a number of different manufacturers and may be offered in somewhat different configurations featuring flexibility, integration with other elements, support of multiple interfaces, etc. to serve as the differentiation between products.

The cable network interface 100 of FIG. 1 has two major sub-elements, the RF tuner 104 and the Quadrature Amplitude Modulation (QAM) demodulator 106. Minor variations may exist in the modularity and functional elements of these major sub-elements. The function of the Radio Frequency (RF) tuner 104 is to receive all signals on the digital cable system at its cable input and to exclude all but one desired RF channel, containing the digital service of interest at its output 110. An input filter 112 filters the input from the cable system to eliminate noise and interfering signals. A low noise Variable Gain Amplifier (VGA) 114 boosts the signal from the filter 112 to apply the signal to mixer 116. The mixer 116 mixes the output of the amplifier 114 with a tunable oscillator signal from local oscillator 118. This process downconverts the entire block of incoming signals to a lower intermediate frequency (IF), with the signal of interest centered on a fixed, constant value. The output of the mixer 116 is filtered by IF filter 120 and provided to the QAM demodulator 106. The QAM 106 demodulator processes the tuner's IF output 110, converting it to an error free digital stream of, for example MPEG (Moving Pictures Expert Group), transport data, carrying the compressed audio and video services.

Inside the RF tuner the local oscillator 118, controlled by a host processor (not shown), varies in frequency such that the nonlinear combination of the local oscillator signal from 118 and the incoming spectrum from the cable network inside the mixer 116 results in the signal of interest emerging from the mixer 116 centered at the fixed, lower Intermediate Frequency (IF). The IF might be selected to be a value such as 44 MHz.

The input filter 112 eliminates extraneous signals outside the range of valid cable audio/video services (54 MHz to 863 MHz) and the variable gain amplifier (VGA) 114 is automatically adjusted at 132 so that the RF signals passing through the tuner and demodulator remain at optimum levels at all times. The final stage of the RF tuner is an output filter 120, such as for example a surface acoustic wave (SAW) filter 120, which is an electromechanical device designed to only let a small band of signals centered at the IF value pass through and all other RF energy to be heavily attenuated. The SAW filter 120 only passes a standard 6 MHz wide channel and effectively rejects all others. The signal that emerges from the tuner therefore is the channel carrying the service of interest and it has been downconverted to a fixed, standard (IF) frequency for processing by the QAM demodulator 106.

The QAM demodulator 106 receives the incoming 6 MHz wide signal at the intermediate frequency, for example 44 MHz, and again amplifies it to a constant and optimum level through a second variable gain amplifier 130. The gain of VGA 130, as well as VGA 114, is automatically adjusted by one or more closed Automatic Gain Control (AGC) control loops within the QAM demodulator 106. The signal is then processed by an Analog to Digital Converter (A/D or ADC) 134, which converts the incoming stream of time-varying voltages to a serial stream of binary bits representing the voltages of the signal at discrete time intervals. The ADC 134 generally has 10 or more bits of resolution.

The digital stream from A/D 134 is then split into two components, the in-phase component (I) and the out-of-phase component (Q). The Q term is used because the signal is in quadrature with respect to the I signal, meaning it is shifted 90° in phase. Phase separation occurs simultaneously with down conversion to a baseband signal, where the lowest frequency is 0 Hz (DC) and highest frequency 6 MHz. This is in contrast to the incoming 44 MHz IF signal, which has its content symmetrically centered ±3 MHz about the IF signal. The downconversion is accomplished through the use of a balanced mixer (mixers 136 and 138) and the I-Q separation occurs because one of the two halves of the balanced mixer has a signal generated by local oscillator 140 that is shifted 90° in phase relative to the signal applied to the other half of the balanced mixer. The outputs of the balanced mixer, I & Q, are then passed through identical channel filters 142 and 144 that provide the appropriate shaping and attenuation of undesired processing artifacts occurring above the 6 MHz passband.

Figure 2A:
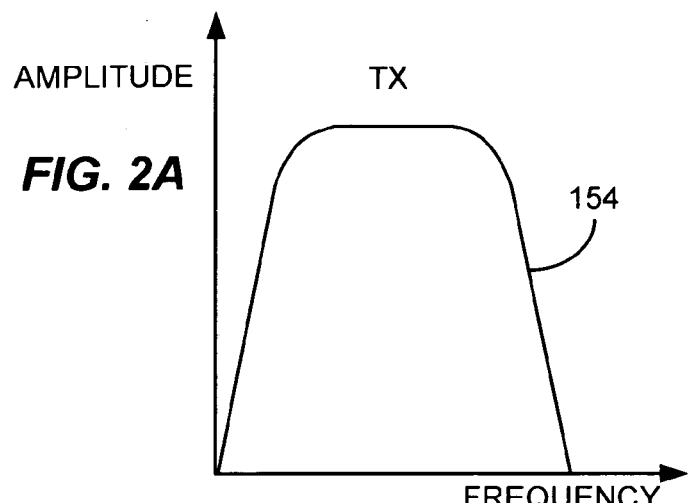
FIG. 2, which is made up of FIGS. 2A, 2B and 2C, are frequency domain graphs depicting equalization in a manner consistent with certain embodiments of the present invention.
Figure 2B:
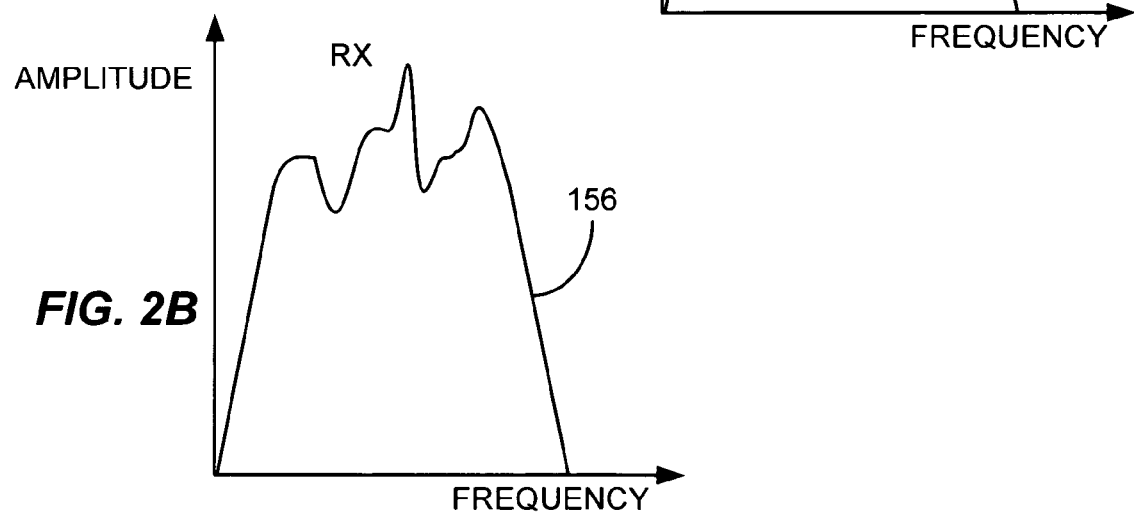
Figure 2C:
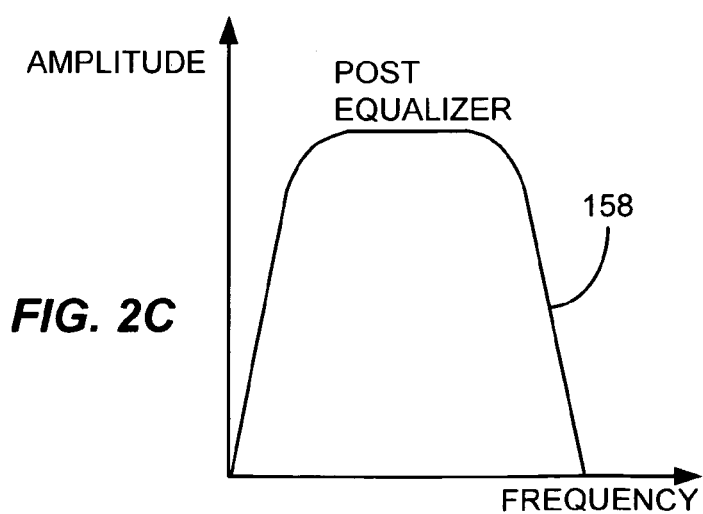

Next, an adaptive equalizer 150 is applied to the outputs of the channel filters 142 and 144. The adaptive equalizer 150 is an automatically self-varying digital filter network that continuously alters its filter characteristic (shape). Its purpose is to compensate automatically for echoes, reflections, dispersion, tilt, intersymbol interference and other distortions that alter the signal from its ideal, original form. Consider, for example, a signal having a transmitted spectrum 154 as shown in FIG. 2A. As this signal is carried by the cable operator's hybrid fiber-coax distribution network to the receiving device various anomalies are introduced that may cause the spectrum to appear at the input of the receiver front end 100 as having the spectrum 156 shown in FIG. 2B. By approaching the ideal of a matched filter, distorted waveforms can be recovered and the error rates for transmitted data reaching the phase recovery element (derotator) significantly reduced. Thus, the job of the adaptive equalizer is to reconstruct the input signal so that its spectrum more closely approximates that of FIG. 2A, such as the spectrum 158 of FIG. 2C. This allows the system to operate successfully under non-ideal conditions, which are typical of real world applications.

Figure 3:
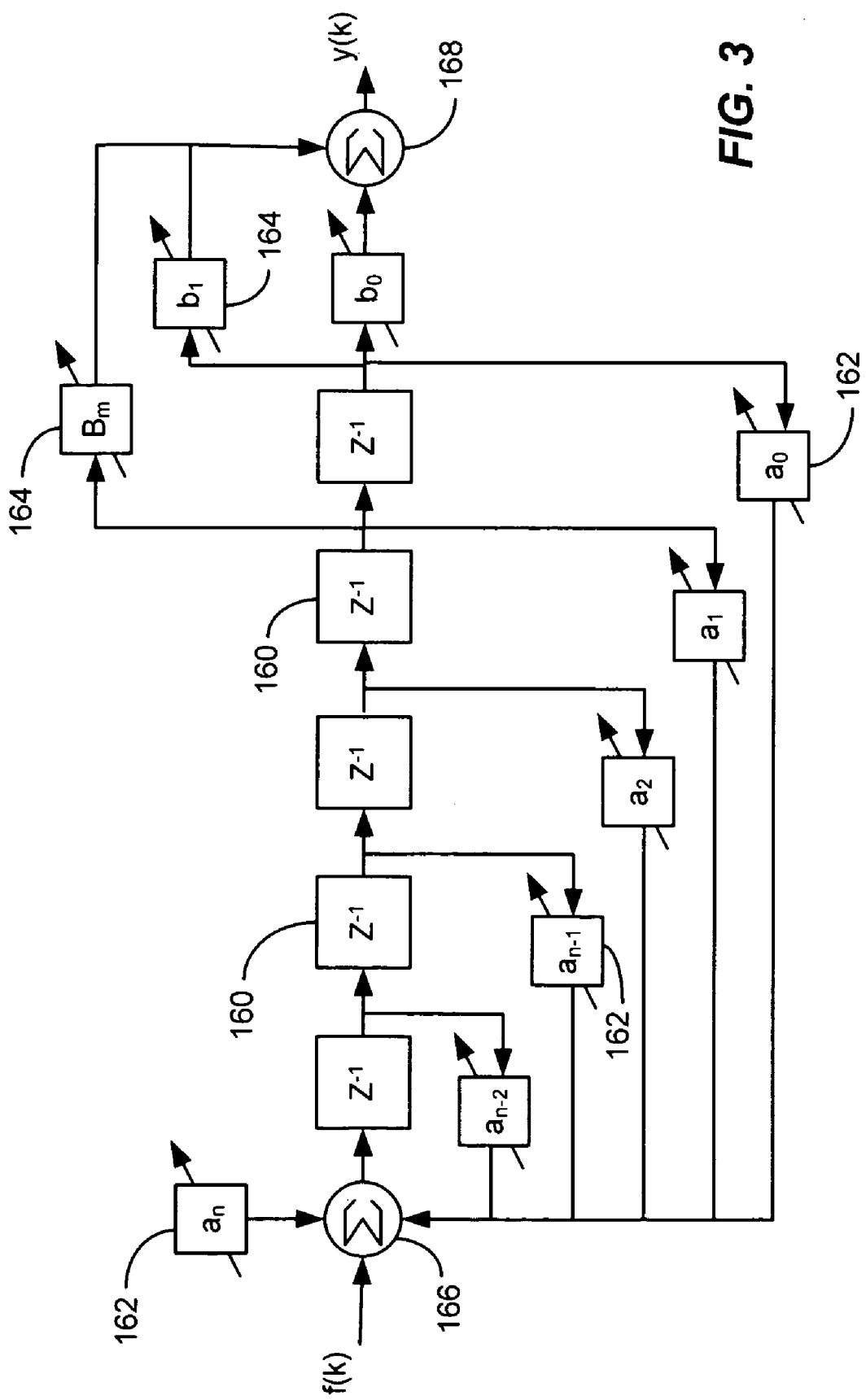
FIG. 3 is a block diagram of an exemplary equalizer consistent with certain embodiments of the present invention.

The details of how the adaptive equalizer 150 is realized differ between different QAM demodulator manufacturers. The general architecture is common between them and takes the form of a classic feed forward/feedback digital filter. A typical digital filter 150 for such a purpose is shown in FIG. 3.

The filter has a cascaded chain of delay stages ($Z^{-1}$) 160 where the discrete time samples of the voltages seen at the demodulator input, converted to binary digital form by the ADC are successively stored when applied to the input as signal sequence f(k). The output of each delay stage tap, in addition to feeding the next cascade, may be fed back to the input or fed forward to the output. The tap feedback may be may be in conjunction with feed forward and either path may be employed exclusively on a tap-by-tap basis. Each feedback or feed forward path has associated with it an independent coefficient term $a_0$ through $a_n$ such as 162 for the feedback tap values and 164 for the feed forward tap values $b_0$ through $b_n$. These tap values may provide amplification or attenuation of the tap output, depending upon the value of the coefficient which acts as a multiplier. The delayed values as modified by the feedback coefficients are added back into the signal chain at 166 and similarly, the values modified by the feed forward factors are added back into the signal chain at 168 to produce the output signal y(k).

Because the equalizer 150 is adaptive, the coefficients dynamically change under the control of a microprocessor, controller or state machine. The values are varied based upon the characteristics of the equalizer output, as seen by the next processing stage, phase recovery. Adaptive equalizers in QAM demodulators vary in implementation between manufacturers. One design, for example, may have a total of 22 taps, where another may have a total of 40 taps—16 feed forward and 24 feedback. Many variations are possible without departing from embodiments consistent with the present invention.

The output of the adaptive equalizer 150 is then processed by the phase recovery block 174, also known as a detector or derotator. The purpose of the detector 174 is to decode the combination of I and Q signals into a single data stream. The detector is able to expand the incoming data streams by a factor of $\log_2$(Modulation Order). This expansion is a factor of 6 for 64-QAM and 8 for 256-QAM, the two typical forms transmitted in digital cable. This expansion is the reason high transport data rates can be efficiently carried in relatively low spectrum bandwidths that seem to violate the Nyquist criterion. The coefficient values 162 and 164 of the adaptive equalizer 150 and the frequency setting of the QAM modulator local oscillator are both controlled by a microprocessor or state machine based upon the success of the detector to "lock" i.e. to recover valid data.

The last processing stage, the forward error corrector (FEC) 180, applies any one or more of a variety of algorithms to the raw recovered digital cable data stream to reduce the likelihood that any of the data has been corrupted with errors in addition to formatting it appropriately for recovery of video and audio services as an MPEG transport stream. It is in this stage that Viterbi (trellis) decoding, de-randomization, Reed- Solomon error correction and MPEG formatting (or other digital formatting) may occur. Some overhead data unique to the operation of these stages are removed from the stream so that the final MPEG transport emerging from the demodulator is identical in form, content and data rate to what the cable operator inserted into the corresponding QAM modulator at the headend for transmission.

Further processing is done to decrypt, demultiplex, decompress and convert the content to a form suitable for display on a television. These functions, while vital to the proper function of the system, are out of context for this document and are conventionally carried out in later functional modules.

In accordance with certain embodiments consistent with the present invention, the ability to detect changes in location of a digital cable receiving device is based in part upon the adaptive equalizer. The equalizer, as indicated, acts as a matched filter to the communications channel. As a result, the values contained within the equalizer's coefficients can be mathematically manipulated to show the transfer function of the communications channel that influences signals passing through it. Stated differently, the values of the coefficients, taken as a set (e.g. a set of forty or so coefficient values or a subset or superset thereof), represent at a specific point in time the sum total knowledge of all mismatches, reflections, phase variations, gain variations, echoes and other perturbations of the transmission media upon the transmitted signal. The fact that the QAM demodulator is able to achieve and maintain signal lock under a given environment validates that the state of the equalizer at that time is such that it accurately reflects the knowledge of the plant's effect upon the system so it can negate those effects and lock successfully. The tolerance to a suboptimal equalizer configuration is low, given the small vector error radii for either QAM-64 or QAM-256 formats used in digital cable. The vector error radius is the composite of effects due to both amplitude and phase errors upon a received signal.

Since the filter coefficient set is directly representative of the transmission environment, it responds dynamically to any changes in that environment. Generally speaking, the low order feedback taps are most often and most significantly affected by high frequency trends, such as impedance variations at the connection or connector on the back of the appliance, reflections within the cable from the house splitter(s), etc. The middle taps are more predominantly affected by variations in the characteristics of the cabling to the tap and distribution amplifier, while the highest order taps are generally most sensitive to channel tilt, dispersion, etc. This data, when combined with the AGC information which indicates total gain required for a constant signal level input, and any other such parameters, provide the basis for a very characteristic fingerprint of the environment where a specific cable appliance is installed.

Tests have indicated that the equalizer is so sensitive to such changes that one can distinguish the cables coming from different ports of an RF splitter to a bank of attached digital cable appliances fed by a single common source. In an experimental case, the devices were all within one meter of each other and had identical cable lengths, yet the values observed for each device were unique and over time were relatively invariant.

If we let an equalizer coefficient be represented by $a \pm jb$, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

here n is the number of feedback coefficients and m is the number of feed forward coefficients.

Likewise, if we let the gain value of one of the multiple AGC loops be represented by k, then $H_2$, the matrix of all AGC coefficients representing the state of the system at one point in time can be represented by:

$$H_2 = \begin{bmatrix} k_0 \\ k_1 \\ \ldots \\ k_l \end{bmatrix}$$

where l is the number of AGC coefficients.

If one were to capture the equalizer tap coefficients and AGC data from a digital cable appliance, applying a thresholding function based upon expected the statistical variance and then an algorithm to allow a weighted summation of the coefficients to a single scalar, a unary value representing the unique "fingerprint" of the environment of the device could be expressed. The threshold and weighting functions could be made unique to a particular operator and are secret to reduce the likelihood of tampering.

The algorithm for these operations then looks like:

Fingerprint$(t) = F(t) = Y(H_1, H_2)$.

In one simple example, the fingerprint value can be, for example:

$$F(t) = \sum_0^n a_n x_n + \sum_0^m b_m y_m + \sum_0^l k_l z_l$$

where the reference to t (time) is indicative that, although relatively time invariant, the various coefficients can in fact vary with time. In this simple example, all feedback coefficients are multiplied by a first set of constants $(x_n)$, all feed forward coefficients are multiplied by a second set of constants $(y_m)$ and all AGC coefficients are multiplied by a third set of constants $(z_l)$.

This fingerprint value is gathered, evaluated and stored in the digital cable appliance memory upon receipt of a command message, such as an EMM from the cable operator. The stored value represents a set of cable television network characteristics at a particular installation and should preferably be secured through encryption and signed to detect tampering.

In certain other embodiments, the fingerprint value Y can be a matrix or set of values (rather than a single value) containing all or part of the values of the equalizer coefficients and all gain values, however, this should not be considered limiting, since other algorithms can also be defined. For example, by adjusting the coefficients so that some of them equal zero, a subset of the equalizer coefficients and some all or none of the gain values could be used. Additional characteristic data can also be used. Similarly, these functions can be mathematically combined as discussed above to produce a more compact fingerprint if desired.

Figure 4:
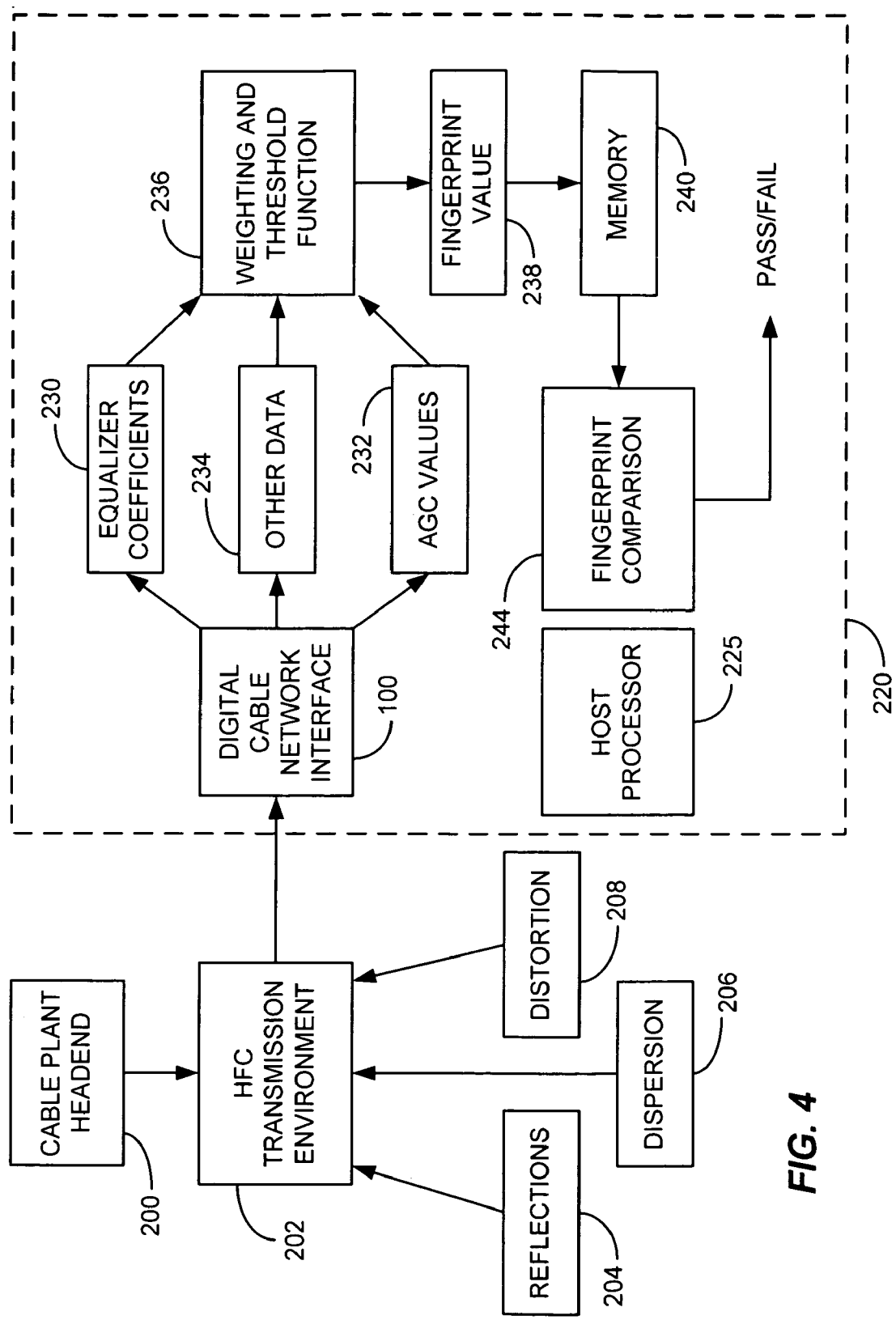
FIG. 4 is a block diagram of a cable network consistent with certain embodiments of the present invention.

FIG. 4 depicts an exemplary cable environment for a network device utilizing certain embodiments consistent with the present invention. In this system, the television signal originates at the cable plant headend 200. The signal passes through the high frequency cable transmission environment 202 (e.g., a hybrid fiber-coax—HFC—system) where various reflections 204, dispersions 206 and distortions 208 and other factors are introduced into the transmitted signal to corrupt the transmitted signal prior to delivery to the network device 220 at the digital cable network interface 100 as previously described. The network device 220 incorporates a host processor 225 such as a microprocessor that operates according to a stored set of programmed steps to carry out the functions described hereafter as well as conventional functions of such a host processor.

In order to carry out a fingerprinting operation consistent with certain embodiments, equalizer coefficients 230, possibly along with AGC gain values 232 and possibly other data 234, are applied to a weighting and threshold function 236 to produce a fingerprint value or collection of values at 238. This value (or these values) is stored in memory 240 and is used for comparison with future or previous fingerprint values in a fingerprint comparison function 244 in accordance with various embodiments that can be devised.

Thus, a self auditing cable television appliance has a mechanism for detecting an event that triggers an audit. A fingerprint value is generated, wherein the fingerprint value is function of the cable television network characteristics at an authorized installation location. A memory stores a reference value. A processor compares the fingerprint value with the stored reference value, wherein: if the fingerprint value is within specified limits of the stored reference value, the cable television appliance carries out a normal operational function; and if the fingerprint value is outside of specified limits of the stored reference value, means for inhibiting the cable television appliance from carrying out a normal operational function.

Figure 5:
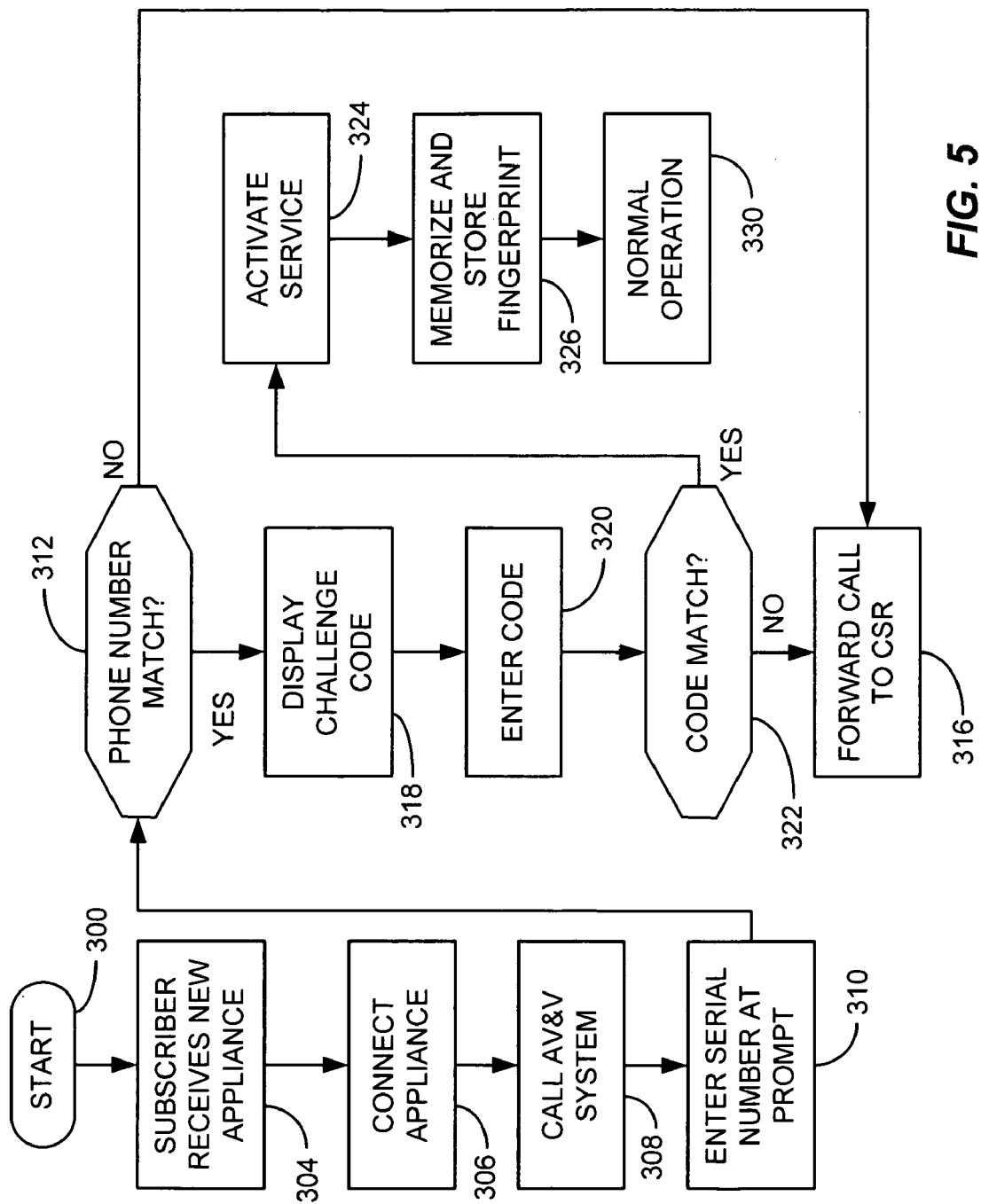
FIG. 5 is a flow chart of an exemplary activation process consistent with certain embodiments of the present invention.
Figure 6:
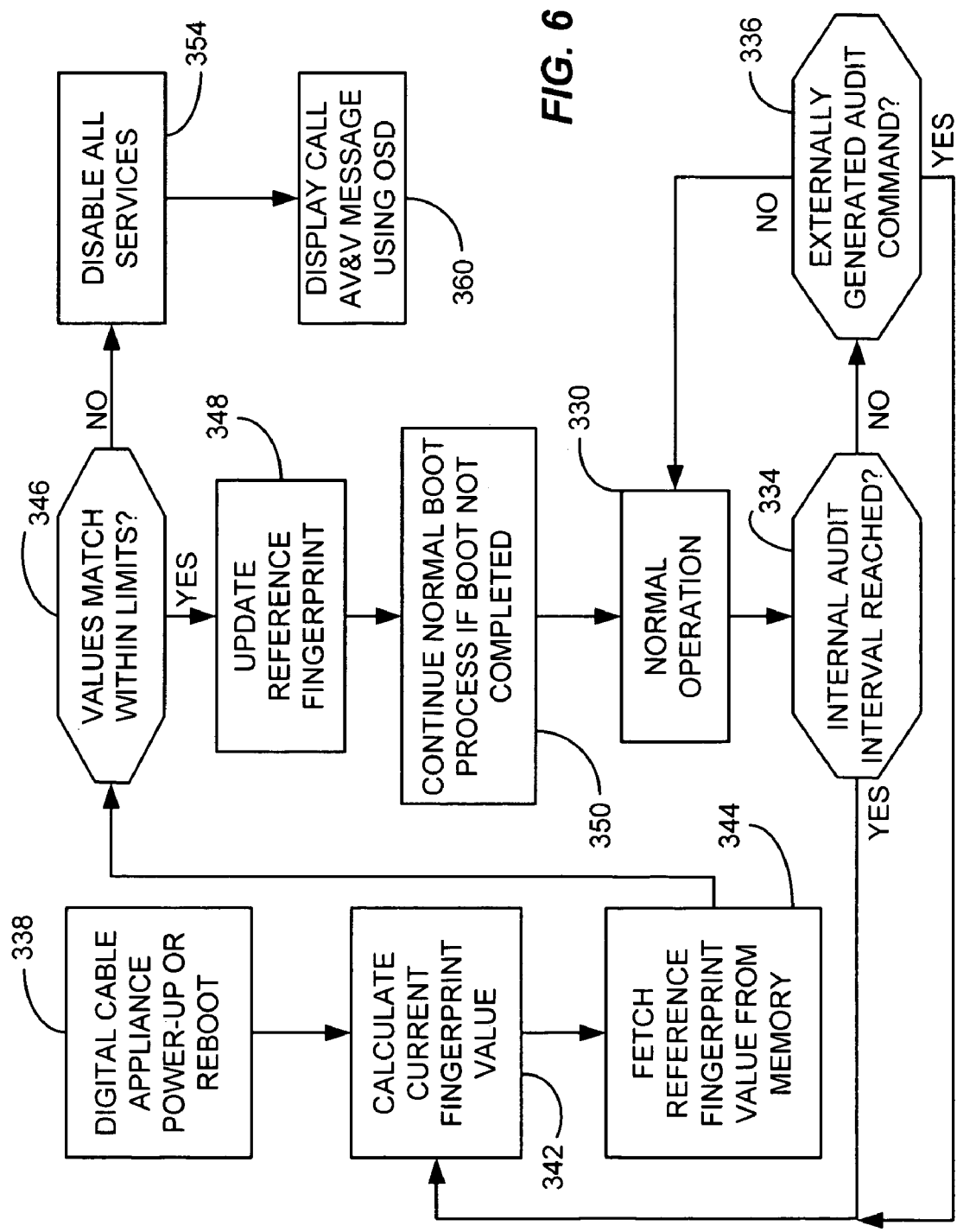
FIG. 6 is a flow chart of an exemplary fingerprint matching process consistent with certain embodiments of the present invention.

One exemplary, but non-limiting, practical embodiment of a system and method employing RF fingerprinting is depicted in FIG. 5 and FIG. 6 as follows:

Starting at 300, a subscriber receives a fingerprint system equipped appliance from the cable operator at 304. The product contains labeling indicating "Call XXX-XXX-XXXX from your home phone after connecting the device to both the cable network and television for activation". Such labeling could, in certain embodiments, be in the form of an on-screen display that is shown at the time of first operation of the appliance. This can be identical in concept to one of the processes followed for activation of home satellite television receivers and credit or Automated Teller Machine (ATM) cards issued through mail by the major financial institutions.

The subscriber follows the instructions connects the appliance at 306 and calls the number on the appliance label after installation at 308, as indicated. An automated validation and verification (AV&V) system at the cable operator receives the call and prompts the subscriber to enter the serial number of the cable appliance at 310 using the keypad on the telephone and may ask the subscriber to press the "#" key upon completion.

Upon receiving the "#" key input or upon other indication that the data entry is complete, the AV&V system confirms the validity of the entered appliance serial number. The system then looks through its subscriber database and finds the record for the subscriber issued the appliance with the entered serial number. It then reads the subscriber's home phone number from the database record. Using ANI, a non-maskable form of caller identification used for calls to toll-free telephone numbers (and 911 calls), the AV&V system then compares the phone numbers at 312 confirms a match between the incoming call and the number of record. If there is no match, the AV&V system refers the call to a customer service representative (CSR) at 316 to resolve any problems. This step validates that an authorized subscriber is attempting to activate the appliance issued to them by the cable operator.

If the ANI and phone number of record match at 312, the AV&V system then sends, via the cable network, an Entitlement Management Message (EMM) command to the appliance having the serial number the subscriber entered by phone. This EMM commands the appliance to display, on the subscriber's television screen, a challenge number sequence at 318 contained within the EMM message and generated at random by the AV&V system. The AV&V system then instructs the subscriber to enter into the telephone, the number displayed on the screen using the keypad on the telephone and to press the "#" key upon completion at 320.

Upon receiving the "#" key input, the AV&V system confirms the validity of the entered challenge number at 322 and if unsuccessful at 322, refers the call to a customer service agent at 316. This step validates that the authorized subscriber is attempting to activate the appliance issued to them by the cable operator at the home of record.

If the challenge sequence is successful at 322, the AV&V system sends another EMM to the now validated appliance, commanding it to perform two steps:

Activate the services authorized for that subscriber at 326, and

Calculate the RF fingerprint for the appliance at the present location and store it in persistent memory at 326. Normal operation of the appliance now proceeds at 330.

With reference to FIG. 6, at periodic audit intervals determined at 334, or when an EMM external command is generated at 336 at or by self-initiation, which uses a timer resident in software, or upon any system reboot at 338, the appliance collects data and calculates an electronic fingerprint value, comparing it to the reference value stored in memory. If the calculated value is within predetermined limits, no further action is taken until the next audit period. If the new value for the fingerprint is sufficiently different from the stored reference value, then the reference value in memory is updated with the new reference value.

Consider the situation of a reboot or power-up. Whenever the appliance is rebooted or otherwise reset, signifying a lapse in network connectivity where the appliance may have been relocated without the authorization of the cable operator, the appliance collects data and calculates an electronic fingerprint value at 342. The reference fingerprint is then retrieved from memory at 344 and these values are compared at 346. If the calculated value is within predetermined limits, the new value may be placed in memory at 348 as the updated reference fingerprint. The cable network device continues the booting process (if necessary) at 350 and services are restored with normal operation at 330. If the match is unsuccessful at 346, all television services are automatically self-deauthorized (disabled, turned off or inhibited) at 354 by the appliance itself. That is, the appliance, by whatever means, does not produce television signals as an output thereof. This can be accomplished by any number of mechanisms including hardware and software disabling techniques (bypassing functional algorithms, disabling power, disrupting a signal flow, substitution of values for signal, gain, frequency, flag or coefficient values, parameters, etc.) An on-screen message can then be generated by the appliance at 360 and displayed on the subscriber's television screen indicating that the cable operator must be contacted at the AV&V telephone number contained within the message for appliance reactivation. This message occurs because the appliance has determined that an unauthorized relocation has occurred. When the subscriber calls the displayed telephone number, the AV&V process is started anew and the location of the device is re-evaluated.

As indicated in FIG. 6, once normal operation is attained, a new audit can be initiated either by a new boot of the appliance at 338, or by expiration of a self timed audit interval at 334 (which also serves to keep the value of the fingerprint updated to reflect slowly changing variables of the cable network and attached devices (e.g., aging, and modification of the network infrastructure). Additionally, receipt of an externally generated audit command can trigger a new audit in certain embodiments. Each triggering operation results in control passing to 342 and operation of the process as described.

Thus, in accordance with certain embodiments, a method of auditing operation of a television appliance, involves detecting an event that triggers an audit; generating a fingerprint value, wherein the fingerprint value is function of the television network characteristics at an authorized installation location; comparing the fingerprint value with a stored reference value; if the fingerprint value is within specified limits of the stored reference value, permitting the television appliance to carry out a normal operational function; and if the fingerprint value is outside of specified limits of the stored reference value, inhibiting the television appliance from carrying out a normal operational function.

Another method of auditing operation of a television appliance consistent with certain embodiments involves detecting an event that triggers an audit (such as reception of a command from 200 to perform the audit); generating a fingerprint value, wherein the fingerprint value is function of the television network characteristics at an authorized installation location; wherein the fingerprint value comprises a function of at least one of the following: at least one equalizer coefficient of an adaptive equalizer of the television appliance and at least one gain coefficient value of an AGC loop of the television appliance; comparing the fingerprint value with a stored reference value; if the fingerprint value is within specified limits of the stored reference value, permitting the television appliance to carry out a normal operational function and storing the fingerprint value for use as the stored reference values in a subsequent audit; and if the fingerprint value is outside of specified limits of the stored reference value, inhibiting the television appliance from carrying out a normal operational function.

Thus, certain embodiments consistent with the present invention address the issue of detecting unauthorized relocation of equipment (including one-way or two-way equipment) consigned to the subscriber by the operator. The method in which it is accomplished uses resources already available in the appliance and adds no additional hardware costs to the product.

Various embodiments are within the scope of the present invention. The APPENDIX to the parent of this application, forms a part of this specification by incorporation by reference and provides further description of an embodiment consistent with the present invention. This APPENDIX forms an actual part of this specification and is hereby incorporated by reference in its entirety. However, no statements made in this APPENDIX constitute any admission whatsoever of prior art. Additionally, the present invention is not to be considered limited to the embodiments described in this APPENDIX.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of auditing operation of a television appliance, comprising:

detecting an event that triggers an audit;

generating a fingerprint value, wherein the fingerprint value is function of the television network characteristics at an authorized installation location, and wherein the fingerprint is a function of at least one of a gain value of a variable gain amplifier and an equalizer coefficient of an adaptive equalizer of the television appliance;

comparing the fingerprint value with a stored reference value to determine if the fingerprint value is within a range of specified value limits of the stored reference value;

if the fingerprint value is within specified limits of the stored reference value, permitting the television appliance to carry out a normal operational function; and if the fingerprint value is outside of specified limits of the stored reference value, inhibiting the television appliance from carrying out a normal operational function.

2. The method according to claim 1, further comprising storing the fingerprint value for use as the stored reference values in a subsequent audit.

3. The method according to claim 1, wherein if the fingerprint value is outside of specified limits of the stored reference value, sending an output signal that produces an on-screen message with instructions on contacting a television content supplier.

4. The method according to claim 1, wherein the stored reference value is stored as a fingerprint value obtained during an activation process for the television appliance.

5. The method according to claim 1, wherein the fingerprint is a function of equalizer coefficients and gain values of an adaptive equalizer and variable gain amplifiers of the television appliance, and wherein an equalizer coefficient is represented by $a \pm jb$, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of gain coefficients; and wherein the fingerprint is given by Fingerprint(t)=$Y(H_1, H_2)$.

6. The method according to claim 1, wherein the event comprises one of the following: expiration of an internal timer of the television appliance; power-up of the television appliance; rebooting of the television appliance; receipt of command from a source external to the television appliance.

7. The method according to claim 1, wherein the fingerprint comprises equalizer coefficients of an adaptive equalizer of the television appliance.

8. The method according to claim 1, wherein the fingerprint comprises gain coefficient values of a variable gain amplifier of the television appliance.

9. The method according to claim 1, wherein the fingerprint comprises a function of at least one gain coefficient value of an AGC loop of the television appliance.

10. The method according to claim 1, wherein the fingerprint comprises a weighting function of at least one of the following: at least one equalizer coefficient of an adaptive equalizer of the television appliance and at least one gain coefficient value of an AGC loop of the television appliance.

11. A non-transitory computer readable storage medium storing instructions which, when executed on a programmed processor, carry out an audit process according to claim 1.

12. A method of auditing operation of a television appliance, comprising:

detecting an event that triggers an audit;

generating a fingerprint value, wherein the fingerprint value is function of the television network characteristics at an authorized installation location;

wherein the fingerprint value comprises a function of at least one of the following: at least one equalizer coefficient of an adaptive equalizer of the television appliance and at least one gain coefficient value of an AGC loop of the television appliance;

comparing the fingerprint value with a stored reference value to determine if the fingerprint value is within a range of specified value limits of the stored reference value;

if the fingerprint value is within specified limits of the stored reference value, permitting the television appliance to carry out a normal operational function and storing the fingerprint value for use as the stored reference values in a subsequent audit; and if the fingerprint value is outside of specified limits of the stored reference value, inhibiting the television appliance from carrying out a normal operational function.

13. The method according to claim 12, wherein if the fingerprint value is outside of specified limits of the stored reference value, sending an output signal that produces an on-screen message with instructions on contacting a television content supplier.

14. The method according to claim 12, wherein the stored reference value is stored as a fingerprint value obtained during an activation process for the television appliance.

15. The method according to claim 12, wherein the fingerprint is a function of equalizer coefficients and gain values of an adaptive equalizer and variable gain amplifiers of the television appliance, and wherein an equalizer coefficient is represented by $a \pm jb$, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of AGC coefficients; and wherein the fingerprint is given by Fingerprint(t)=Y($H_1$, $H_2$).

16. The method according to claim 12, wherein the event comprises one of the following: expiration of an internal timer of the television appliance; power-up of the television appliance; rebooting of the television appliance; receipt of command from a source external to the television appliance.

17. A non-transitory computer readable storage medium storing instructions which, when executed on a programmed processor, carry out an audit process according to claim 12.

18. A self auditing television appliance, comprising:
means for detecting an event that triggers an audit;
means for generating a fingerprint value, wherein the fingerprint value is function of the television network characteristics at an authorized installation location, and wherein the fingerprint is a function of at least one of a gain value of a variable gain amplifier and an equalizer coefficient of an adaptive equalizer of the television appliance;
a memory that stores a reference value;
a processor for comparing the fingerprint value with the stored reference value to determine if the fingerprint value is within a range of specified value limits of the stored reference value, wherein:
if the fingerprint value is within specified limits of the stored reference value, the television appliance carries out a normal operational function; and
if the fingerprint value is outside of specified limits of the stored reference value, means for inhibiting the television appliance from carrying out a normal operational function.

19. The apparatus according to claim 18, further comprising means for storing the fingerprint value in the memory for use as the stored reference values in a subsequent audit.

20. The apparatus according to claim 18, wherein if the fingerprint value is outside of specified limits of the stored reference value, means for sending an output signal that produces an on-screen message with instructions on contacting a television supplier.

21. The apparatus according to claim 18, wherein the stored reference value is stored as a fingerprint value obtained during an activation process for the television appliance.

22. The apparatus according to claim 18, wherein the fingerprint is a function of equalizer coefficients and gain values of an adaptive equalizer and variable gain amplifiers of the television appliance, and wherein an equalizer coefficient is represented by a±jb, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of AGC coefficients; and wherein the fingerprint is given by Fingerprint(t)=Y($H_1$, $H_2$).

23. The apparatus according to claim 18, further comprising a timer, and wherein the event comprises expiration of the timer.

24. The apparatus according to claim 18, wherein the event comprises one of power-up of the television appliance; rebooting of the television appliance; receipt of command from a source external to the television appliance.

25. The apparatus according to claim 18, wherein the fingerprint comprises equalizer coefficients of an adaptive equalizer of the television appliance.

26. The apparatus according to claim 18, wherein the fingerprint comprises gain coefficient values of a variable gain amplifier of the television appliance.

27. The apparatus according to claim 18, wherein the fingerprint comprises a function of at least one gain coefficient value of an AGC loop of the television appliance.

28. The apparatus according to claim 18, wherein the fingerprint comprises a weighted function of at least one of the following: at least one equalizer coefficient of an adaptive equalizer of the television appliance and at least one gain coefficient value of an AGC loop of the television appliance.

29. A self auditing television appliance, comprising:
an AGC loop circuit having a plurality of variable gain amplifiers, where the gain value of one of a plurality of variable gain amplifiers is given by k, and $H_2$, is the matrix of all gain values representing the state of the AGC circuit at one point in time can be represented by:

$$H_2 = \begin{bmatrix} k_0 \\ k_1 \\ \ldots \\ k_l \end{bmatrix}$$

where l is the number of AGC coefficients;
an equalizer circuit having a plurality of equalizer coefficients, wherein an equalizer coefficient is represented by a±jb, then $H_1$, the matrix of all equalizer coefficients representing the state of the system at one point in time can be represented by:

$$H_1 = \begin{bmatrix} a_0 & b_0 \\ a_1 & b_1 \\ \dots & \dots \\ a_n & b_m \end{bmatrix}$$

where n is the number of feedback coefficients and m is the number of feed forward coefficients;

means for detecting an event that triggers an audit, wherein the event comprises one of power-up of the television appliance, rebooting of the television appliance, receipt of command from a source external to the television appliance, and expiration of a timer;

means for generating a fingerprint value, wherein the fingerprint value is function of the television network characteristics at an authorized installation location, and wherein the fingerprint is given by Fingerprint(t)=Y($H_1$,$H_2$);

a memory that stores a reference value as a stored as a fingerprint value obtained during an activation process for the television appliance;

a processor for comparing the fingerprint value with the stored reference value to determine if the fingerprint value is within a range of specified value limits of the stored reference value, wherein:

if the fingerprint value is within specified limits of the stored reference value, the television appliance carries out a normal operational function;

if the fingerprint value is outside of specified limits of the stored reference value, means for inhibiting the television appliance from carrying out a normal operational function and sending an output signal that produces an on-screen message with instructions on contacting a television supplier; and a memory for storing the fingerprint value in the memory for use as the stored reference values in a subsequent audit.

\* \* \* \* \*